(12) United States Patent
Mazzei et al.

(10) Patent No.: US 6,193,893 B1
(45) Date of Patent: Feb. 27, 2001

(54) STRIPPING OF CONTAMINANTS FROM WATER

(75) Inventors: Angelo L. Mazzei; Raymond M. Meyer, both of Bakersfield, CA (US)

(73) Assignee: GDT Corporation, Phoenix, AZ (US)

( * ) Notice: Subject to any disclaimer, the term of this patent is extended or adjusted under 35 U.S.C. 154(b) by 0 days.

(21) Appl. No.: 09/405,315

(22) Filed: Sep. 23, 1999

Related U.S. Application Data

(63) Continuation-in-part of application No. 09/045,234, filed on Mar. 20, 1998, now abandoned.
(51) Int. Cl.<sup>7</sup> ............................ B01D 19/00; B01D 17/035
(52) U.S. Cl. .......................... 210/702; 210/718; 210/738; 210/750; 210/787; 210/788; 210/198.1; 210/221.2; 210/416.1; 210/512.1; 55/459.1; 55/468; 95/254; 95/261; 95/263; 96/202; 96/208; 96/209; 366/163.2
(58) Field of Search ...................................... 210/702, 718, 210/738, 750, 787, 788, 198.1, 512.1; 55/221.2, 416.1, 468, 459.1; 95/254, 261, 263; 96/202, 208, 209; 366/163.2

(56) References Cited

U.S. PATENT DOCUMENTS

| | | | |
|---|---|---|---|
| 4,123,800 | * 10/1978 | Mazzei | 366/163.2 |
| 5,202,032 | * 4/1993 | Shoemaker | 210/718 |
| 5,338,341 | * 8/1994 | Mazzei et al. | 96/209 |
| 5,674,312 | * 10/1997 | Mazzei | 95/261 |

* cited by examiner

*Primary Examiner*—David A. Reifsnyder
(74) *Attorney, Agent, or Firm*—Donald D. Mon

(57) ABSTRACT

Process and apparatus to strip volatile contaminants from a liquid supply stream in which the contaminants are dissolved. A gas inducing mixer-injector injects a stripping gas into the stream to form a mixed stream of liquid with its contaminants and bubbles of the stripping gas. The mixed stream is passed through a tangential degasser separator, withdrawing separated gas and water, while maintaining the flow part from the injector to the outlets of the separator at sub-atmospheric pressure.

24 Claims, 4 Drawing Sheets

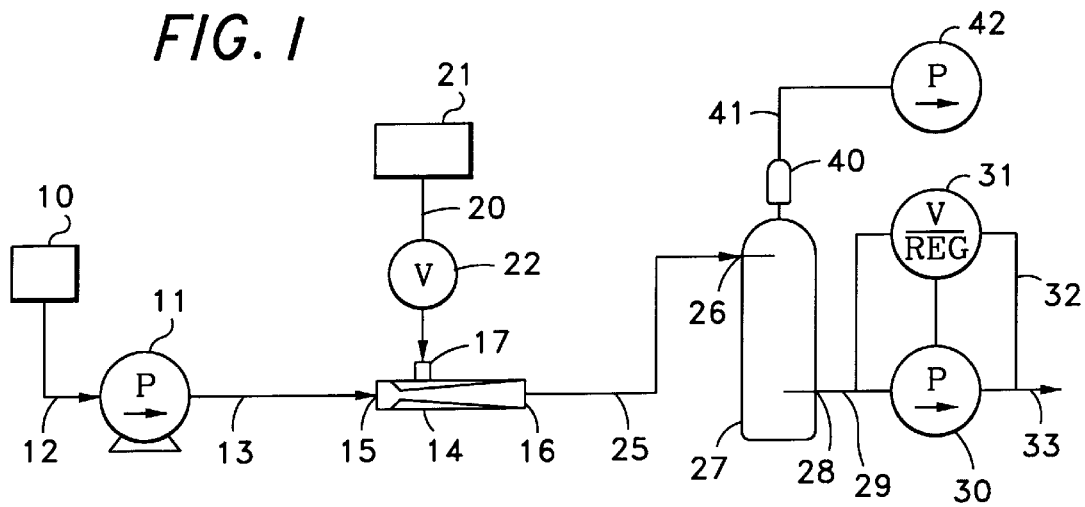
FIG. 1
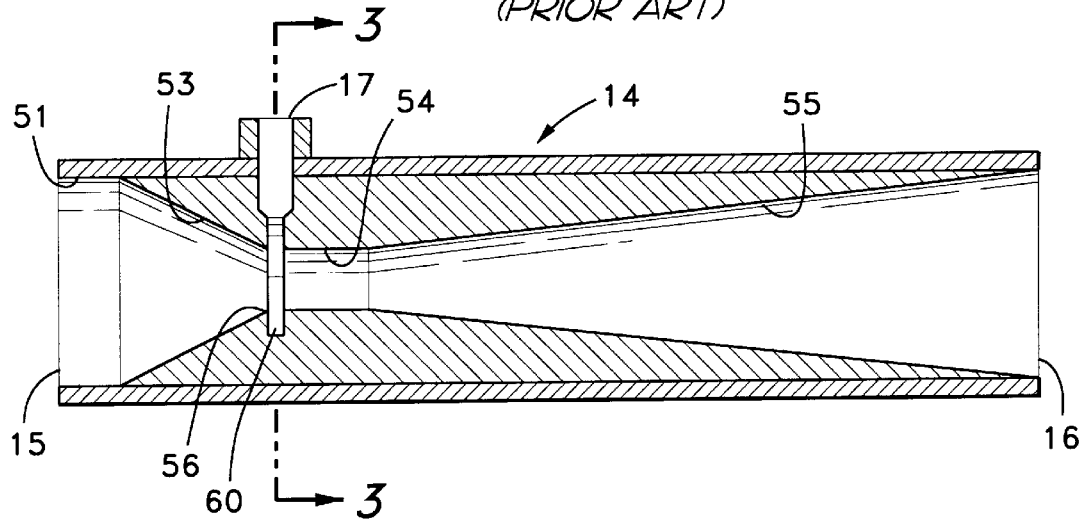
FIG. 2 (PRIOR ART)
FIG. 3 (PRIOR ART)

STRIPPING OF CONTAMINANTS FROM WATER

REFERENCE TO OTHER PATENT APPLICATION

This is a continuation-in-part of applicant's U.S. patent application Ser. No. 09/045,234 filed Mar. 20, 1998 entitled Stripping of Contaminants from Water, now abandoned.

FIELD OF THE INVENTION

Removal of volatilizable contaminants from liquids such as water by means of a stripping injected gas such as air.

BACKGROUND OF THE INVENTION

Water used for domestic, agricultural, and industrial use is increasingly becoming contaminated with objectionable substances. Their hazards include health risks, damage to water transmission systems and their components, damage to processing equipment, and fouling of products, crops, cropland, and industrial sites.

Because this contamination has become so severe and pervasive, it is not surprising that many efforts have been made toward remediation. Remediation in this context means removal of volatilizable compounds that are dissolved in liquid such as water to be treated, or that are dissolved in water used to extract the contaminants from soil.

There are numerous physical and chemical processes for this purpose, such as reverse osmosis and chemical treatment. However these are mostly useful for relatively small applications, and are very capital intensive in waterwork applications where the flow rate of water to be treated is very high. Further, these processes frequently involve very costly chemical reagents and high energy costs.

Other remediation pathways have been employed, especially for high rate of flow applications. Their objective is to transfer the contaminant from water into a gas, usually air. The contaminant is encouraged to leave its solution in the water and enter the gas phase as a gas, crossing the interface between the water and the gas phase as it does so. The gas with the contaminant in it is conveyed away, and the concentration of contaminant in the water is reduced.

The effectiveness of such systems is greatly impacted by the total amount of surface area of interface between the water and the air. Common expedients to increase this surface area are found in counterflow towers, in which water flows downwardly while a current of air flows upwardly, making contact with the surface of the water. Increasing the interface area is commonly accomplished by filling the tower with a packing such as rings or plates to spread out the water for contact by the current of air.

Such equipment tends to be large, costly, and excessively consumptive of energy. It is large because the tower must accommodate bulky packing to provide sufficient interface area. It is excessively consumptive of energy because air must be passed in large amounts over the interface surface in order to keep the concentration of contaminant in the air low enough to encourage passage of the contaminant from solution into the air.

Because remediation does not produce income (except to the suppliers of the equipment), its cost, the cost of the real estate area it occupies, and the energy it consumes are subject to close and reluctant scrutiny.

Another known remediation pathway is to spray the water in the form of droplets from the top of a tower. As the droplets fall they encounter an upward counterflow of air. The interface is now on the surface of drops instead of on a sheet of water. At least theoretically the total area on the drops can be much larger than the total area provided in packed towers of similarly sized installations.

Both of these well-known systems face irreducible limits on the total surface area of their interfaces. In towers there can be only so much packing while still allowing contiguous space for sufficient air to pass through them. In spray towers there is a physical limitation on the density and size of the droplets if they are to remain discrete and separated so as to be contactible by the air. Excessive reduction of droplet size soon renders the droplet flow subject to entrainment in the air stream.

The foregoing examples illustrate the irreducible lower limits on the size of the equipment, mainly because of the inherent requirement for space to accommodate a given amount of interface in one arrangement and to prove space between droplets. for air flow that does not entrain the drops in the other. In these arrangements the situation is either not improved or is worsened if the system is operated at a sub-atmospheric pressure.

Henry's law indicates that the solubility of a volatile compound in water decreases along with a decrease in system pressure. It follows that transfer from water across an interface into air is favored by a reduction in pressure. While the rate of transfer across the interface between the water and the air will be the same for the interface in any system at the same pressure with identical concentrations in the water and in the air, the above physical constraints are ultimate limitations on the unit performance of the equipment at any pressure and temperature.

It is an object of this invention to overcome these limitations and to provide a process and process equipment which cost less to purchase and operate, while producing improved removal of the contaminant in equipment of considerably reduced size and footprint. Further, it is adaptable to a wider range of flow rates and operating pressures.

For example, a conventional counterflow tower which utilizes a downwardly flowing spray of water may require a 13 feet diameter tower, 19 feet high, and about 25 hp for its operation. As an example of its effectiveness, about 85% of tetrachloroethylene (TCE) or carbon dioxide present in the water will be removed. Their Henry's constants are about equal. The cost of such an installation tends to be about $210,000.00.

In contrast, an installation according to this invention requires a height of only about 7 feet for a separation chamber about 12 inches in diameter for the same flow rate of water, consuming only about 8 hp. This system will remove about the same amount of the same contaminant. The cost of this installation tends to be about $65,000.00. It is much smaller and less expensive to operate.

The superiority of results and costs of the installation and operation are evident and surprising.

BRIEF DESCRIPTION OF THE INVENTION

A system according to this invention in effect reverses the interface between the water and the gas used in conventional systems. In the existing art the water is formed with an outer boundary (interface) externally contacted by or surrounded by the gas. This interface is where the contaminant can leave the water. Its area is limited to the total surface area of the exposed surfaces of sheets of water or the total surfaces of a group of practically-sized droplets of water. In either case, the contaminant must travel through the water in the droplets or sheets of water so as to reach the interface where it can be transferred to the air.

These conventional arrangements involve the problem that only gases which finally reach and pass through the interface can be vented. There is no assistance for the contaminant while in the water to reach the interface. The entire process relates to the migration of the released small amounts of contaminant into the gas so as to reach an equilibrium as indicated by Henry's law.

According to this invention a myriad of micro-bubbles of air is injected into a water stream flowing through a cavitating mixer-injector. The total surface area of the interfaces formed by these bubbles is very much greater than attainable by conventional processes, and because the bubbles can be thoroughly and vigorously mixed into the water stream, the path length of a contaminant molecule through the water to the nearest interface is greatly reduced. There are as many paths as there are bubbles, and the space between them is minimized. The mechanics of the transfer are importantly improved.

In addition, and of critical importance, is the operation of this entire system at sub-atmospheric pressure, thereby reducing the solubility of the contaminant in the water. The gas phase in the bubbles will contain an increased concentration of the contaminant for this reason, and the contaminant is trapped in the bubble so it will not be re-dissolved in the water while at the reduced pressure.

Once this transfer of contaminant to the gas phase is accomplished and the contaminant is trapped, it is necessary to separate the gas and the contaminant it contains from the water. Conventional practice has been simply to vent the air from the tower or other separator at atmospheric pressure. However, this means that the contaminant will remain in the water in the concentration corresponding to atmospheric pressure.

According to this invention, the mixed liquid (water) stream containing the bubbles is fed to a centrifugal de-gassing separator which by spinning the water physically causes the bubbles to move toward the center, assuring their movement and passage through additional water which was previously between bubbles, thereby further increasing the rate of removal of gases. This leaves a spinning body of processed water substantially free of the bubbles, and of the vaporized contaminant they contain.

Further according to this invention, the entire system, including the de-gassing separator, is operated at a sub-atmospheric pressure so the contaminant will not re-dissolve in the water. The gas phase is drawn from the separator by a vacuum pump. The processed water is removed by suction apparatus which withdraws processed liquid at such a rate that the apparatus downstream from the mixer-injector remains at sub-atmospheric pressure. As a consequence of all of the foregoing, an importantly-increased removal of the contaminant is attained, because the concentration of the contaminant which remains in the processed water is that which corresponds to the solubility at the reduced pressure as indicated by Henry's law, even though it has returned to atmospheric pressure.

The above and other features of this invention will be fully understood from the following detailed description and the accompanying drawings, in which:

BRIEF DESCRIPTION OF THE DRAWING

FIG. 1 is a system diagram showing the presently preferred embodiment of the invention;

FIG. 2 is an axial cross-section of a prior art injector shown in U.S. Pat. No. 4,123,800, which is useful in this invention;

FIG. 3 is a cross section taken at line 3—3 in FIG. 2;

Detailed Description of the Invention

Figure 4:
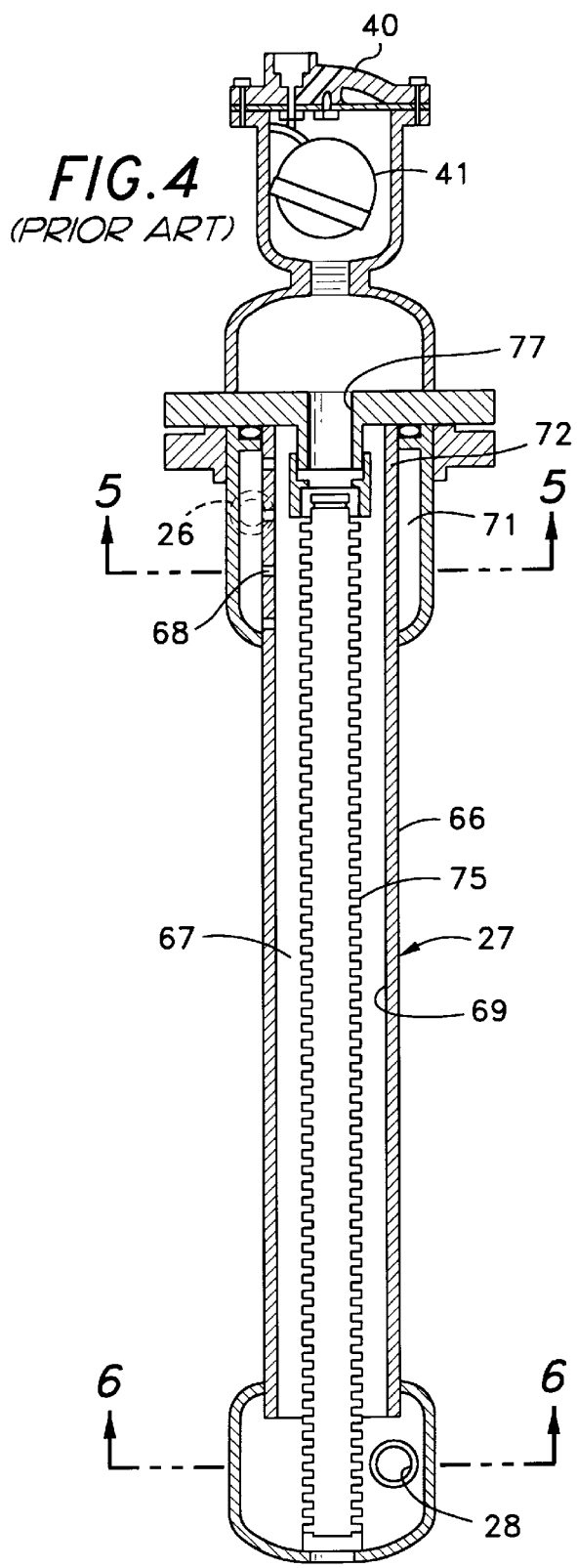
FIG. 4 is an axial cross section of a prior art degassing separator shown in U.S. Pat. No. 5,339,341, which is useful in this invention.

The operative events necessary for this invention occur in a closed system maintained entirely at a sub-atmospheric pressure. While the processed liquid and the separated gases will eventually emerge into the atmosphere, the liquid and gases to be separated will be maintained at a sub-atmospheric pressure until after they are separated and are separately released from the system.

The preferred embodiment of the invention is shown in FIG. 1 where the entire liquid supply stream of liquid (water) is passed through both an injector and a centrifugal degassing separator.

A liquid supply 10 may be such as a well, pond, reservoir or main supply which supplies water for treatment. Water is disclosed as an example of liquids which can be usefully treated. Whenever water is described, it is to be understood that it exemplifies any other liquid to be treated. Booster pump 11 is a booster or supply pump to assure that the downstream system is supplied with liquid at the necessary pressure and rate of flow to sustain the system's demands. Booster pump 11 may be unnecessary if the characteristics of the water supply are such as to supply adequate water at the correct rate of flow, for example a sufficient elevation.

Conduit 12 conveys liquid to pump 11. Conduit 13 conveys a liquid supply stream from the source to a mixer injector 14. Mixer injector 14 is shown in full detail in FIG. 4. It includes an inlet port 15, an outlet port 16, and an injector port 17. A conduit 20 conveys gases from a gas supply 21 (which may be the atmosphere or a source of gas under pressure) to injector port 17 at a rate controlled in part by valve 22. Gas is injected into the liquid stream at injector port 17.

In this invention, the gas will usually be air, although it could, instead, be any other suitable gas useful for the intended purpose. Whenever air is described, it will be understood that it is exemplary of any other useful gas.

A conduit 25 conveys a mixed stream of water and bubbles from outlet port 16 to an inlet port 26 of a centrifugal de-gassing separator 27. The de-gassing separator has a liquid outlet port 28 which discharges through conduit 29 to a booster pump 30 which will draw water from the system at a rate which will maintain a desired sub-atmospheric pressure in the upstream system.

A pressure regulator valve 31 is plumbed into a by-pass loop 32 between conduit 29 and outlet conduit 33. The purpose of the regulator valve is to return water to the upstream side of the booster pump so as to maintain just the desired sub-atmospheric pressure in the system. Should the system pressure rise above the desired level, valve 31 will close the loop. Should the pressure decrease excessively it will open so as to admit water under downstream (atmospheric) pressure to raise the system pressure to its desired value. Booster pump 30 is preferably a centrifugal type.

Should the use of a regulator valve and by-pass loop be objectionable, then booster pump 30 may instead be a variable rate type, whose pumping rate may be adjusted to maintain the desired sub-atmospheric pressure, perhaps with a variable frequency drive slaved to a pressure/vacuum sensor in the system.

Outlet conduit 33 discharges to a point of use (not shown). The point of use may be such as a pump, a pond, a pressurized water distribution system, or any other place where suitably treated water is desired for use or for storage.

A degasser relief valve 40 is fitted to the top of the separator. It is sensitive to the presence of gas, and is provided with a sensor such as float 41 (FIG. 4) which indicates that there is gas to be removed, and the valve will open. Should water appear at that level, the valve will close so that only gas can leave the separator through valve 40. This valve is the upper most elevation of liquid with separator. Of course it is necessary to expel the gas against atmospheric pressure, because merely opening the valve without a downstream control would admit air to the separator and raise the pressure.

For this purpose, a vacuum pump 42 is connected to conduit 41 that leads from the top of the separator. It may conveniently be a vane-type or a gear-type pump. When gas is to be removed from the separator, pump 42 will remove the gas by pumping it against the atmosphere, and aiding booster pump 30 in maintaining the sub-atmospheric pressure in the system.

Should the contaminants not be suitable for discharge into the atmosphere, gas from pump 42 will be sent to a suitable storage or destruction facility. For example if the contaminant is ozone, it will be sent to an ozone destructor.

The mixer-injector used in this invention is a cavitating type which draws a vacuum when water flows through its throat at a sufficient velocity. This is a distinctly different device from flow measuring venturi-type devices, in which only a reduced pressure is developed in the throat to be compared with another pressure. The objective of the mixer injector used in this invention is to draw a fluid—either gas or liquid—into a flowing stream in proportion to the mass flow through its throat and mix it into the main stream.

Injectors useful in this invention are shown in Mazzei U.S. Pat. No. 4,123,800. This patent is incorporated herein by reference in its entirety for its showing of the construction of a suitable injector.

Mixer-injector 14 is shown in full detail in FIG. 2. It includes an inlet section 51, and between section 51 and exit port 16, a tapered gradually decreasing constricting section 53, a generally cylindrical throat section 54, and a tapered gradually increasing enlarging section 55. Injector port 17 enters the throat section downstream from the constricting section, preferably very close to the intersection 56 of the constricting section and the throat section. This placement next to the generally frusto-conical constricting section results in a tendency of the stream to "overshoot" the injector port, creating a very low, sub-atmospheric pressure at the injector port, and a tendency for the injected gas and the water to mix violently. The injector port enters the throat in a group of openings, or in a peripheral groove 60 as shown in FIG. 3. At this point there is formed a mixed stream, comprising liquid with its contaminants and bubbles, filled with gas into which at least some of the contaminants will migrate.

The "system" which is maintained at sub-atmospheric pressure extends from the throat section 54 of the mixer injector to pumps 30 and 42. Water and gas in this system between these locations will be at the pressure defined by the pumps.

Although any mixer injector can be used which draws a vacuum, optimum mixer injectors are shown in Mazzei's U.S. Pat. No. 4,123,800 and in the drawings in this application. These are sold by Mazzei Injector Corporation, 500 Rooster Drive, Bakersfield, Calif. 93307.

Figure 5:
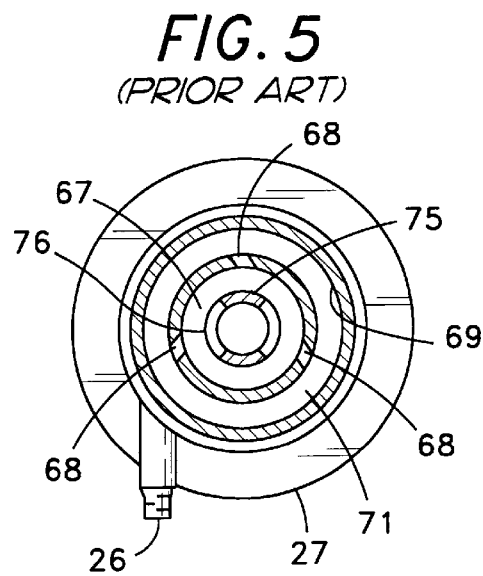
FIG. 5 is a cross-section taken at line 5—5 in FIG. 4.
Figure 6:
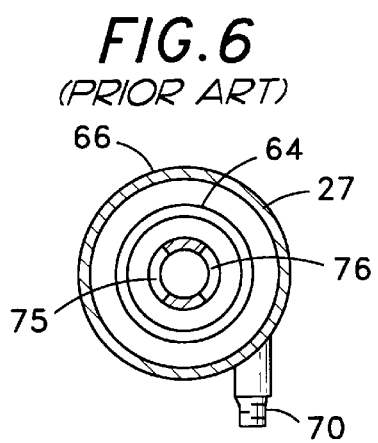
FIG. 6 is a cross-section taken at line 6—6 in FIG. 4.

While any degassing separator may be used which can operate to provide centrifugal separation, an optimal device is shown in Mazzei's U.S. Pat. No. 5,338,341, issued Aug. 16, 1994, which is incorporated herein by reference in its entirety for its showing of the construction and operation of such a separator. It is also shown in FIGS. 4–6 herein. Degassing separators of this type are available from Mazzei Injector Corporation, 500 Rooster Drive., Bakersfield, Calif. 93307.

As best shown in FIG. 4, a centrifugal degassing separator 27 includes a case 66 having a inner separator chamber 67 with a cylindrical wall 69. A group of tangentially-directed nozzles 68 open into chamber 67 near its upper end so as to produce a whirling stream flowing downwardly along cylindrical wall 69 toward a drain port 28 at the lower end of the case. Processed liquid is withdrawn from liquid outlet port 28.

A peripheral supply chamber 71 surrounds an extension 72 of wall 69 which receives water from port 26. Water flows from chamber 71 through the nozzles.

A gas separator tube 75 extends axially downward into chamber 67. It is cylindrical and hollow, and has a plurality of slots 76 through it. Gas outlet port 77 exits at the upper end of the case. Gas outlet valve 40 connects to gas outlet port 77.

In operation, the centrifugal force of the whirling stream causes gas bubbles to migrate toward the center, whereby to pass through the slots and rise in the separator tube toward the outlet.

It will be observed that both the mixer-injector (at and beyond its throat section) and the degassing separator are always under sub-atmospheric pressure while the system is operating. The system is filled with water or whatever liquid is being treated, along with the undissolved gases in the liquid, and along with the gases injected by the mixer-injector. Until after the treatment is completed there is no exposure of the liquid in the system to the atmosphere.

Depending on system parameters, conduit 25 may or may not be provided, and the effluent from the mixer-injector could be injected directly into the de-gassing separator. However, it frequently will be desirable to provide more residence time for the contaminant gas to transfer into the bubbles before removing the gas from the water. A length of conduit 25, or even a tank can be provided for that purpose. Generally a very high percentage of the contaminant which ultimately could be removed is in fact removed while the gas is still in enlarging section 55 of the mixer-injector.

The size and proportions of the elements of the system will be selected according to system performance parameters, such as rate of flow of liquid required, and the nature and concentration of the contaminants.

A broadly useful group of operating pressure conditions is as follows:

Conduit 13: 20 psig
Conduit 25: 15 in Hg
Conduit 28: 20 in Hg
Conduit 33: 20 psig
Conduit 41: 20 in Hg At these pressures, the reduction of concentration of contaminant gas will be importantly reduced. The previously-given examples of removal of TCE and carbon dioxide is such an example.

The term "volatilizable" is used herein to mean a contaminant which is dissolved in the liquid, but which can be drawn as a gas into the gas phase. Other examples are other VOC's (volatile organic compounds) such as tetrachloroethylene and benzene ethyl toluene xylene (BETEX). Other gases are such as radon and oxygen.

It will be appreciated that in order for the transfer of contaminants to occur as contemplated by this invention, the system from the throat of the mixer-injector to the gas outlet port (or more specifically to valve 42) and to the drain port of the separator must be maintained at a sub-atmospheric pressure. The mass flow of the system comprises the liquid supplied to the mixer-injector (which includes contaminants) plus the treatment of gas supplied at the mixer-injector. This total flow is divided by the separator into a gas flow to the gas outlet port, and a liquid flow to the drain port. The gas flow from the separator will comprise the treatment gas plus the contaminants removed. The liquid flow from the drain port will comprise all of the processed liquid, plus reduced dissolved contaminants, and possibly some dissolved treatment gas.

Obviously to admit air into this closed system except at the throat would destroy its function. Therefore in order to remove the gas and the liquid from the separator while maintaining a sub-atmospheric pressure, suction means must be provided to remove the gases and processed liquid.

The presently-preferred such means is shown in FIG. 1. Vacuum Pump 42 is a classic type which withdraws gas from lower pressures and in so doing boosts its pressure to atmospheric or such other pressure as may be desired. In any event it acts as a unidirectional pump, preventing backflow and extracting the gas. It is not permitted to pump liquid, by valve 40.

The sub-atmospheric pressure is basically created by booster pump 30, which draws liquid through the system in opposition to the restriction of the mixer-injector. The rate of flow is maintained such that the system remains at the desired pressure.

Figure 7:
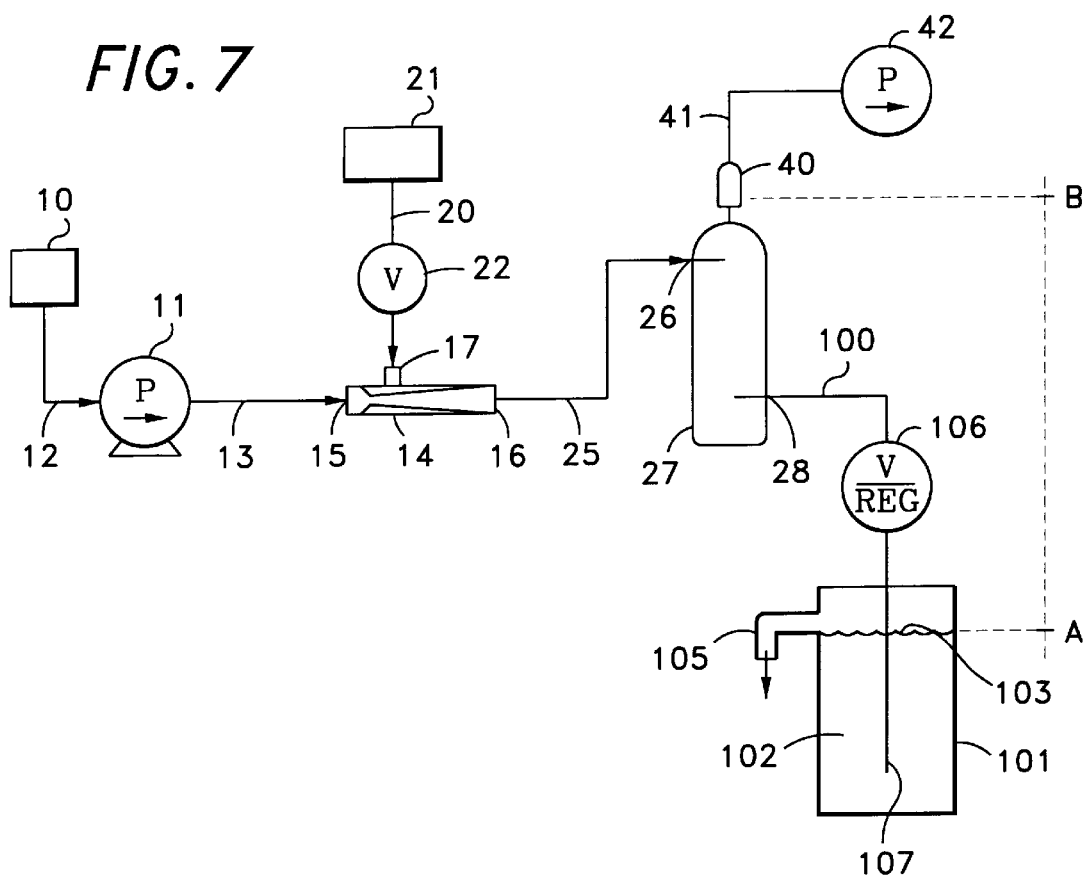
FIGS. 7, 8, and 9 are system diagrams showing other embodiments of the invention.
Figure 8:
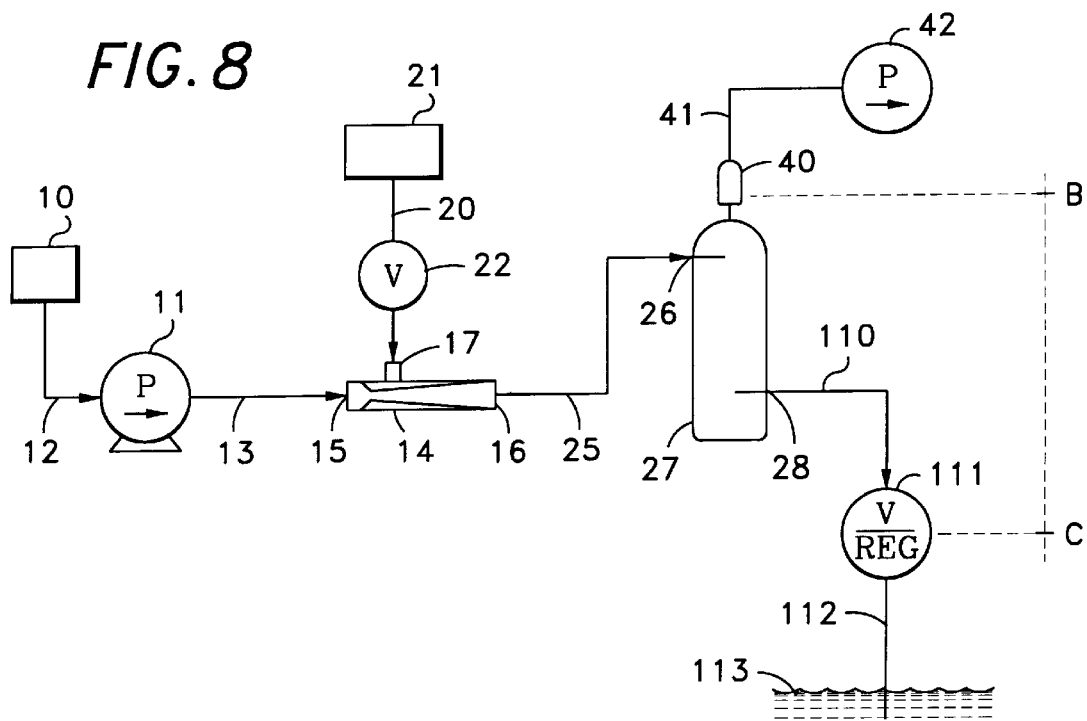
Figure 9:
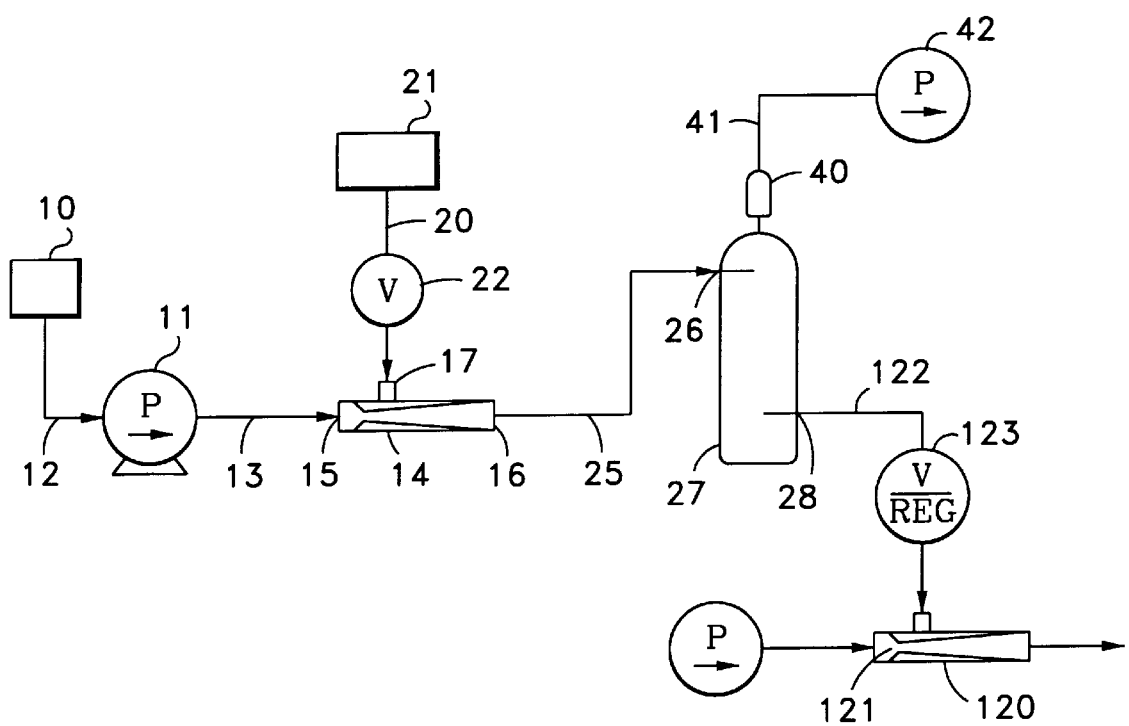

A booster pump is the preferred example of "suction apparatus", whose function is to maintain a demand flow adequate to cause the sub-atmospheric Pressure. Other embodiments of suction apparatus which may be substituted for a booster pump are shown in FIGS. 7,8, and 9. These may be directly substituted for the booster pump, and will provide the same function. The same numbers are used in FIGS. 7,3, and 9 as in FIGS. 1–6 because of their identity.

In FIG. 7, a siphon conduit 100 is connected to liquid drain port 28. It extends downwardly to a vessel 101 having a body of water 102 therein whose surface 103 is maintained at a desired elevation A in receptacle 104 by an overflow pipe 105. An optional regulator valve 106 adjustable to establish a desired rate of flow may be placed in siphon conduit 100.

Attention is called to elevation B, which is the highest elevation of the water in the separator. Elevation B is established by valve 40, which allows pumping out of gas above that elevation, but does not permit water to pass.

In optimum operation, elevation B will be about 32 feet higher than elevation A, because this is the maximum height of a column of water which will remain cohesive and draw a full vacuum. It will be appreciated that a different sub-atmospheric pressure can be selected by raising the elevation of the surface by raising the receptacle or the overflow pipe, or adjusting the regulator valve when it is used. The length 107 of the siphon conduit below the surface 103 acts as means to prevent backflow of air into the system.

FIG. 8 shows a system similar to FIG. 7 with a siphon conduit 110, and a regulator valve 111. Conduit 110 is connected to draw in port 28. This system is not dependent on the level of a receptacle. Instead it relies on the regulator valve to regulate the rate of liquid flow to maintain the desired sub-atmospheric pressure. The elevation C of the regulator is preferred at 32 feet below that of elevation B when water is the liquid but not mandatory depending on the back pressure regulator device. Length 112 of conduit below the regulator valve dips into water 113 to prevent backflow of air. Water 113 may be in a reservoir, a pond, stream, river or any other body of water.

FIG. 9 illustrates that the suction apparatus may be any other suitable source of a low unidirectional regulative pressure flow acting as an aspirator which may have water or even air passing through its throat. In this embodiment the suction apparatus is a mixer-injector 120 similar to mixer injector 14. Flow through its throat 121 will draw liquid from suction conduit 122, even at an elevation level with or above that of drain port 28. If desired a regulator valve 123 may be placed in conduit 122 to regulate the rate of flow therethrough. A simple venturi device may be used instead of the more complex mixer-injector.

Thus, suction apparatus exemplified by pump 30, siphon conduits 100 and 110, and an aspirator such as mixer-injector 120 are all suitable for withdrawing liquid from the system.

This invention is not to be limited by the embodiments shown in the drawings and described in the description, which are given by way of example and not of limitation, but only in accordance with the scope of the appended claims.

What is claimed is:

1. A process for stripping volatile contaminants from a liquid stream in which the contaminants are dissolved, comprising the following steps in the order recited:

utilizing a gas-inducing mixer-injector having a inlet port, a tapered constricting section, a substantially cylindrical throat section, an enlarging section and an outlet port in that order, and an injector port in said throat section, said sections being so proportioned and arranged as to create a reduced pressure in said throat when said liquid supply stream flows from inlet port to outlet port, flowing said liquid supply stream through said injector, said mixer-injector drawing a stripping gas into said liquid supply stream through said injector port to form a mixed stream of liquid with it contaminant and bubbles of said stripping gas, at least some of said contaminants entering the stripping gas in said bubbles;

passing said mixed stream to a centrifugal degassing separator;

said degassing separator having a drain port, an inner separator chamber with a cylindrical wall and a nozzle proportioned and arranged so as to discharge said mixed stream tangentially along said cylindrical wall to create a swirling centrifugal flow from the nozzle toward the drain port, a perforated gas separator tube extending centrally in said chamber to receive said separated gas from said bubbles which separated gas has been centrifugally separated from the liquid, and a gas outlet port opening into said separator tube to receive said separated gas, said liquid remaining after separation of the gas being processed liquid;

utilizing a vacuum pump at said gas outlet port, withdrawing said separated gas from said separator tube for disposition after it exits from the vacuum pump; and utilizing a booster pump connected to said drain port, said booster pump withdrawing said processed liquid from said drain port while continuously maintaining that portion of the flow path of liquid and gas which extends from the throat of the injector to the gas outlet port and to the drain port of the separator at sub-atmospheric pressure.

2. A process according to claim 1 in which said booster pump has an inlet and an outlet, said booster pump inlet draining processed liquid from said drain port from which separated gas has already been separated, and in which a by-pass loop including a pressure regulator valve interconnects said booster pump inlet and booster pump outlet, thereby to regulate a desired sub-atmospheric pressure in said portion of said flow path.

3. The process according to claim 2 in which a supply pump supplies said liquid stream to the inlet port of the mixer-injector at a rate sufficient to supply the amount of liquid required for flow through said portion at desired sub-atmospheric pressure.

4. The process according to claim 1 in which said booster pump drains processed liquid at a rate which maintains a desired sub-atmospheric pressure in said portion, said booster pump being a variable rate pump.

5. The process according to claim 1 in which the volume of conduit between the outlet port of the mixer-injector and the degassing separator allows for dwell time to encourage contaminant passage into the bubbles.

6. A process for stripping volatile contaminants from a liquid stream in which the contaminants are dissolved, comprising the following steps in the order recited:

utilizing a gas-inducing mixer-injector having a inlet port, a tapered constricting section, a substantially cylindrical throat section, an enlarging section and an outlet port in that order, and an injector port in said throat section, said sections being so proportioned and arranged as to create a reduced pressure in said throat when said liquid supply stream flows from inlet port to outlet port, flowing said liquid supply stream through said injector, said mixer-injector drawing a stripping gas into said liquid supply stream through said injector port to form a mixed stream of liquid with it contaminant and bubbles of said stripping gas, at least some of said contaminants entering the stripping gas in said bubbles;

passing said mixed stream to a centrifugal degassing separator;

said degassing separator having a drain port, an inner separator chamber with a cylindrical wall and a nozzle proportioned and arranged so as to discharge said mixed stream tangentially along said cylindrical wall to create a swirling centrifugal flow from the nozzle toward the drain port, a perforated gas separator tube extending centrally in said chamber to receive said separated gas from said bubbles which separated gas has been centrifugally separated from the liquid, and a gas outlet port opening into said separator tube to receive said separated gas, said liquid remaining after separation of the gas being processed liquid;

utilizing a vacuum pump at said gas outlet port, withdrawing said separated gas from said separator tube for disposition after it exits from the vacuum pump; and utilizing suction apparatus having an inlet connected to said drain port, said suction apparatus adapted to exert suction at said drain port to withdraw said processed liquid and separate said processed liquid from the drain port while maintaining that portion of the flow path of liquid and gas which extends from the throat of the injector to the gas outlet port and to the drain port of the separator at sub-atmospheric pressure.

7. The process according to claim 6 in which the volume of conduit between the outlet port of the mixer-injector and the degassing separator allows for dwell time to encourage contaminant passage into the bubbles.

8. The process according to claim 6 in which said suction apparatus comprises a siphon conduit extending from said drain port to the surface of a body of water whose elevation is lower that said gas outlet port.

9. The process according to claim 8 in which a length of said suction conduit extends beneath said surface.

10. The process according to claim 8 in which a regulator valve adjusts the rate of flow through the siphon conduit.

11. The process according to claim 6 in which said suction apparatus is an aspirator.

12. The process according to claim 6 in which said suction apparatus is a mixer-injector.

13. A system for stripping volatile contaminants from an incoming liquid stream from a source of said liquid to produce an outgoing stream with a reduced concentration of said contaminant, said system comprising:

a cavitating type mixer-injector comprising a body, said body having a passage therethrough with an inlet port, an outlet port, a tapered constricting section, a generally cylindrical throat section, and a tapered enlarging section in that order between said inlet port and said outlet port, an injector port through said body opening into said throat section, said constricting section and throat section being so proportioned and to form a local region of reduced pressure in said throat;

said injector port being adapted to receive stripping gas from a source of stripping gas;

a centrifugal de-gasser separator having an inlet port in fluid communication with the outlet port of said injector, a drain port to release liquid from which stripping gas and some contaminant has been separated by said separator, and a gas outlet port to release gas that has been separated from the stream by said separator, said separator comprising a case having an inlet port and forming an inner separator chamber with a cylindrical wall having a linear axis, a nozzle in said inlet port directing flow of liquid in a tangential path on said cylindrical wall whereby to produce a whirling stream flowing toward said drain port, a gas separator tube extending axially and centrally in said chamber from said gas outlet port, said separator tube being hollow and having a plurality of perforations therethrough along its length, there being substantial annular space between said separator tube and said cylindrical wall;

a conduit conveying fluid from said mixer injector to said inlet port of said separator;

a gas outlet valve connected to said gas outlet port;

a vacuum pump connected to said gas outlet valve to expel gas from said separator;

suction apparatus drawing liquid from said drain port, said system being adapted for operation at sub-atmospheric pressures by said suction apparatus and being closed between the throat section of the mixer-injector and the drain port and gas outlet port of the separator except at the injector port of said injector.

14. A system according to claim 13 in which said suction apparatus is a booster pump plumbed to said drain port to pump liquid from the separator chamber thereby to maintain said sub-atmospheric pressure in the system.

15. A system according to claim 14 in which said booster pump is a variable rate pump.

16. A system according to claim 14 in which a regulator valve connects the inlet and outlet ports of said booster pump to maintain a selected sub-atmospheric pressure.

17. A system according to claim 13 in which said suction apparatus is a booster pump plumbed to said drain port to pump liquid from the separator chamber thereby to maintain said sub-atmospheric pressure in the system.

18. A system according to claim 17 in which a regulator valve connects the inlet and outlet ports of said vacuum pump to maintain said sub-atmospheric pressure.

19. A system according to claim 13 in which the volume of said conduit between the outlet port of the mixer-injector and the de-gassing separator allows for dwell time to encourage contaminant passage into the bubbles.

20. A system according to claim 13 in which said suction apparatus comprises a siphon conduit extending from said drain port to the surface of a body of water whose elevation is lower than said gas outlet port.

21. A system according to claim 20 in which a length of said suction conduit extends beneath said surface.

22. A system according to claim 20 in which a regulator valve adjusts the rate of flow through the siphon conduit.

23. A system according to claim 13 in which said suction apparatus is an aspirator.

24. A system according to claim 13 in which said suction apparatus is a mixer-injector.

* * * * *